US012008641B1

(12) United States Patent
Adam et al.

(10) Patent No.: US 12,008,641 B1
(45) Date of Patent: Jun. 11, 2024

(54) NEAR INSTANTANEOUS PAYMENT CARD OR LOAN APPROVAL USING DIGITAL IDENTITY

(71) Applicant: UIPCO, LLC, San Antonio, TX (US)

(72) Inventors: Patrick Adam, Helotes, TX (US); Benjamin Goos, San Antonio, TX (US); Gabriel Carlos Fernandez, San Antonio, TX (US); Christopher Paul Blanchard, San Antonio, TX (US); Gage Robert Lynch, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1095 days.

(21) Appl. No.: 16/712,600

(22) Filed: Dec. 12, 2019

Related U.S. Application Data (60) Provisional application No. 62/778,652, filed on Dec. 12, 2018.

(51) Int. Cl.
| | | |
|---|---|---|
| G06Q 40/02 | (2023.01) | |
| G06F 16/23 | (2019.01) | |
| G06F 21/60 | (2013.01) | |
| G06Q 40/03 | (2023.01) | |
| G06Q 50/26 | (2012.01) | |
| H04L 9/40 | (2022.01) | |

(52) U.S. Cl.
CPC ......... *G06Q 40/03* (2023.01); *G06F 16/2379* (2019.01); *G06F 21/602* (2013.01); *G06Q 50/265* (2013.01); *H04L 63/083* (2013.01); *H04L 63/0861* (2013.01); *H04L 63/0884* (2013.01)

(58) Field of Classification Search
CPC .............................. G06F 17/60; G06Q 20/36
See application file for complete search history.

(56) References Cited

U.S. PATENT DOCUMENTS

2003/0046222 A1\* 3/2003 Bard .................... G06Q 20/403
705/38
2014/0067675 A1 3/2014 Leyva et al.

\* cited by examiner

*Primary Examiner* — Ojo O Oyebisi
(74) *Attorney, Agent, or Firm* — Perkins Coie LLP (57) ABSTRACT

Systems and methods are described to facilitate an efficient on-boarding experience for users joining a financial institution, while maintaining the integrity of certain operations to determine whether the users are eligible for certain financial products based on the personal information of the users. For instance, a first server may perform an approval process by receiving a request to verify an identity of the user using a digital identity service, sending to a second server a request to obtain one or more categories of personal information about the user, receiving personal information associated with the one or more categories selected by or authorized by the user, determining, based on at least some of the received personal information, that the user is approved for a payment card, and sending information associated with the payment card to a mobile device.

19 Claims, 11 Drawing Sheets

NEAR INSTANTANEOUS PAYMENT CARD OR LOAN APPROVAL USING DIGITAL IDENTITY

CROSS-REFERENCE TO RELATED APPLICATIONS

This application is a non-provisional of and claims priority to U.S. Provisional Application No. 62/778,652, filed on Dec. 12, 2018, entitled "NEAR INSTANTANEOUS PAYMENT CARD OR LOAN APPROVAL USING DIGITAL IDENTITY," which is hereby incorporated by reference in its entirety for all purposes.

BACKGROUND

A person requesting a credit card is familiar with the lengthy process of obtaining a credit card, especially when the person is also applying to be a member of a bank offering the credit card. For instance, a new member requests a credit card first by filling out an application and sending the application to a bank for further processing, such as verification and authorization. The verification process may include the bank verifying certain information about the new member, such as whether the new member's name on the received application matches his or her name on a government issued identity card (e.g., a driver's license). The verification process may also include the bank requesting and obtaining the new member's credit score from one or more credit rating institutions. Finally, the bank may authorize the new member for a physical credit card that arrives in mail in a few business days.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A conventional process to obtain a payment card can take days or longer for either a person just joining a bank that offers the payment card or existing customers. An example of a payment card includes a credit card. The process begins with a new member filling out an application with certain personal information about the person or calling a customer service representative associated with the bank to provide personal information. The personal information is sent to a bank to verify the identity of the person and to determine whether the person is authorized for the payment card. Once the bank performs these operations, the bank may determine that the person is qualified for a payment card and then send the payment card to the person via mail. This entire process is lengthy and often involves the person sharing personal information that the person has already shared with other service providers, such as other financial institutions or credit rating agencies.

Personal information previously provided by a person and, in some cases, verified by one or more agencies, can be aggregated by digital identity service providers. A digital identity is an online or networked identity adopted or claimed in cyberspace by an individual, organization or electronic device. The digital identity can include personal information about a person, such as the person's name, birthday, social security number, or credit score. People can share such personal information in several contexts using a digital identity. For example, a person can provide personal information with a third party to provide services for the person. The third party may be a digital identity service provider that may aggregate the personal information provided by that person and by other persons. Based on the aggregated personal information, digital identity service providers may obtain several pieces of personal information about a person. Since a person's digital identity already includes some or all of the information that may be required to obtain a payment card, the techniques described in this patent document leverages off of the previously known digital identity of the person to approve a payment card that can be instantly used by the person.

The systems and methods described in this patent document allow a financial institution to obtain from a digital identity service provider personal information of a user so that the financial institution can approve a digital payment card that can be instantly used by the user on the user's mobile device. Specifically, in some embodiments, a user may use his or her mobile device to open an account with a financial institution and to request a payment card or a loan without requiring the user to enter his or her personal information for the financial institution to perform its verification and/or authorization operations.

In one example implementation, a user may use an application running on a mobile device (or other device) to create an account with a financial institution, where the application can display options to the user as to whether the user wants to join (and/or apply for a payment card or a loan) by manually entering his or her personal information or to join by using his or her digital identity. If the user selects to join using digital identity, then the mobile device application displays one or more names of the one or more digital identity service providers, where the one or more names may be stored on the mobile device assuming the user is registered with one or more of the digital identity service providers. If the user selects a digital identity service, then the mobile device application may make an application programming interface (API) call to another application associated with the selected digital identity service.

After the user authenticates with the digital identity service, the mobile device displays one or more names of one or more categories of personal information, such as personal profile of the user (e.g., name, date of birth, or address) or credit score information of the user. The one or more categories are requested by a server associated by the financial institution from another server associated with the digital identity service provider. The categories requested by the financial institution server may include categories (e.g., the personal profile of the user) that are be necessary for the financial institution server to perform its verification and/or authorization operations or can simply include the pieces of information needed.

Once the user authorizes the personal information associated with the one or more categories to be sent to the financial institution server (the categories may be individually selectable), the personal information is sent from the digital identity service server to the financial institution server for further processing. Based on at least some of the received personal information, the financial institution server may determine that the user is approved (or disapproved) for a payment card (or loan). The financial institution server may send information about the payment card approved for the user to the mobile device. If the user selects one of the payment cards, the financial institution server authorizes the selected payment card for use by the user. Subsequently, the user may be able to use his or her mobile device to use the payment card. In some implementations, the user can use the card immediately if the user has access to a card verification value. In some implementations, the user has a separate mobile application that provides a dynamic card verification value (i.e., card verification value changes periodically rather than being static information on the payment card). Thus, the systems and methods described in this patent document allow a user to instantly use the payment card based on a fast payment card or loan approval process using a digital identity.

Figure 1:
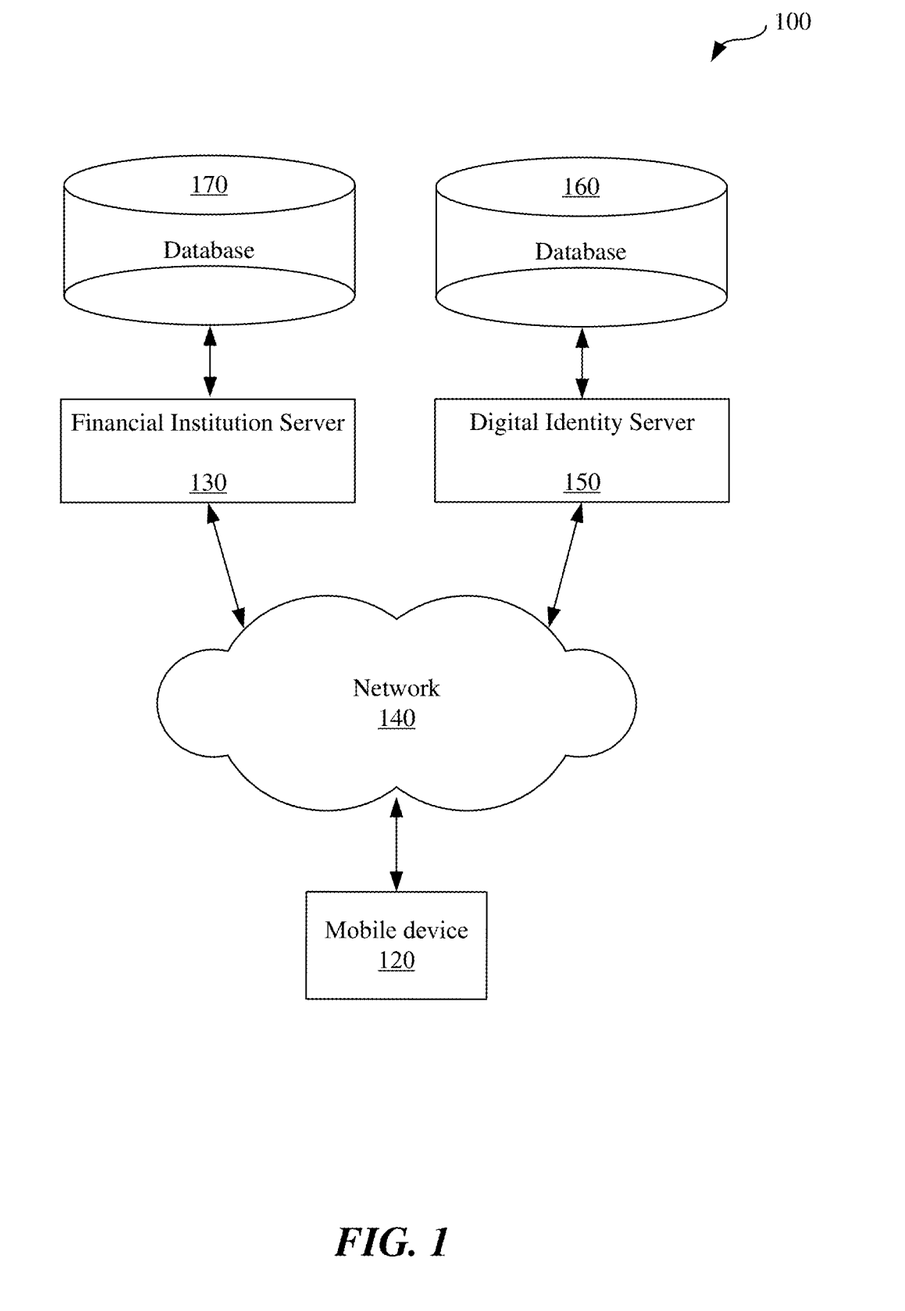
FIG. 1 shows an example system used to approve a payment card or a loan for a person using digital identity.

FIG. 1 shows an example system used to approve a payment card or a loan for a person using digital identity, where the person may be a new member of a financial institution. The approval system 100 may include a mobile device 120, financial institution server 130, and a digital identity server 150 that can communicate with each other via the network 140, such as the Internet. The financial institution server 130 may include a database 170 where it may store member account information (e.g., member's name, password, credit information, or payment cards issued). The digital identity server 150 may be in communication with a database 160 where personal information may be collected and stored. The personal information stored in the database 160 may be processed by the digital identity server 150 that may generate a digital identity identifier (e.g., a number 12345). The digital identity server 150 may store and/or associate the digital identity identifier with the personal information of a person (e.g., name, birthday, social security number of Jane Doe). In some implementations, the digital identity identifier may be stored on the mobile device 120 so that a mobile device application can determine whether the user (e.g., Jane Doe) using the mobile device 120 has a digital identity.

As further described in this patent document, digital identity may provide a continuous backend validation of an identify of and information about a person. Because the identity of and certain information about the person may be verified or validated at the speed of authentication, the approval system 100 may more efficiently process the personal information associated with the digital identifier as compared to the conventional process described above. A benefit of using digital identity for verifying a user's identity and/or information is that the personal information associated with the digital identity may be continuously updated. For example, if a person has moved from one state to another state, the digital identity may provide the latest personal information as applicable to the person's situation.

Figure 2A:
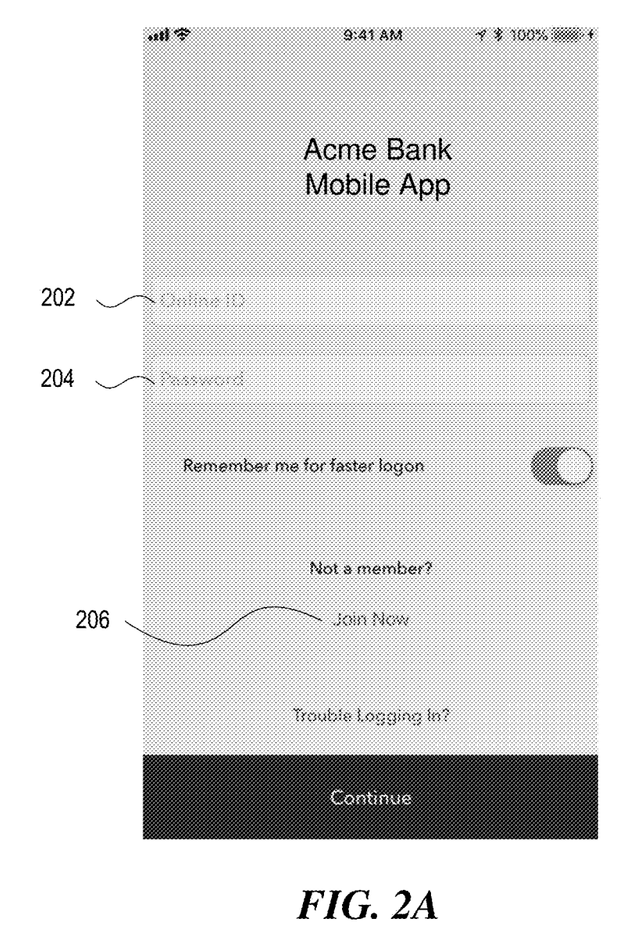
FIGS. 2A-2K show examples of graphical user interfaces (GUIs) displayed to the user via a mobile device.

The operations of the approval system 100 is further explained in the context of graphical user interface (GUI) that may be displayed on the mobile device 120 and that are shown in FIGS. 2A-2K. FIG. 2A shows a login screen for a user (e.g., a new member) to log into his or her account using a username 202 and a password 204, where the account information (including the username and/or password) may be stored by the financial institution server 120. The login screen may present an option to the user to join as a member 206 and create a new account if the user is not already a member.

Figure 2B:
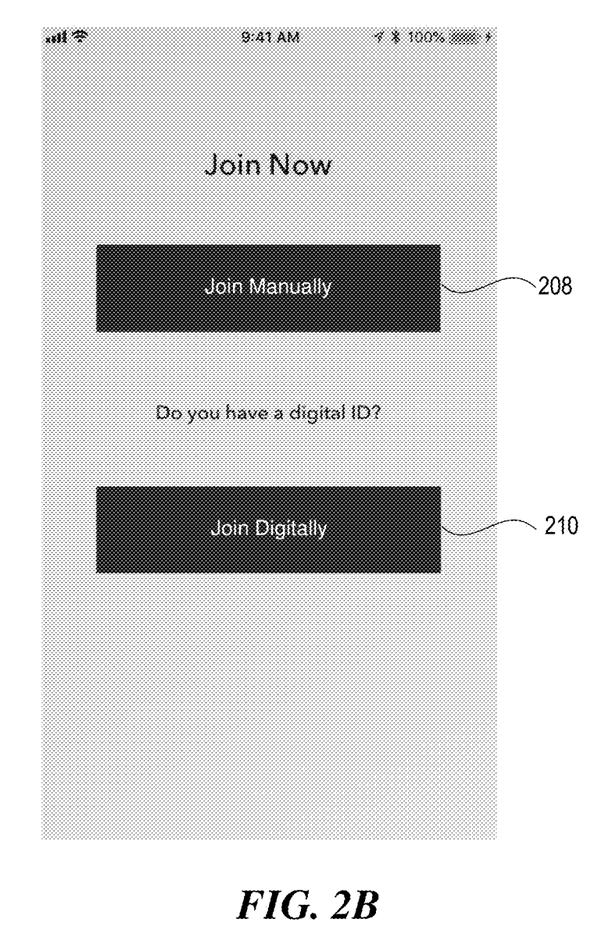
Figure 2C:
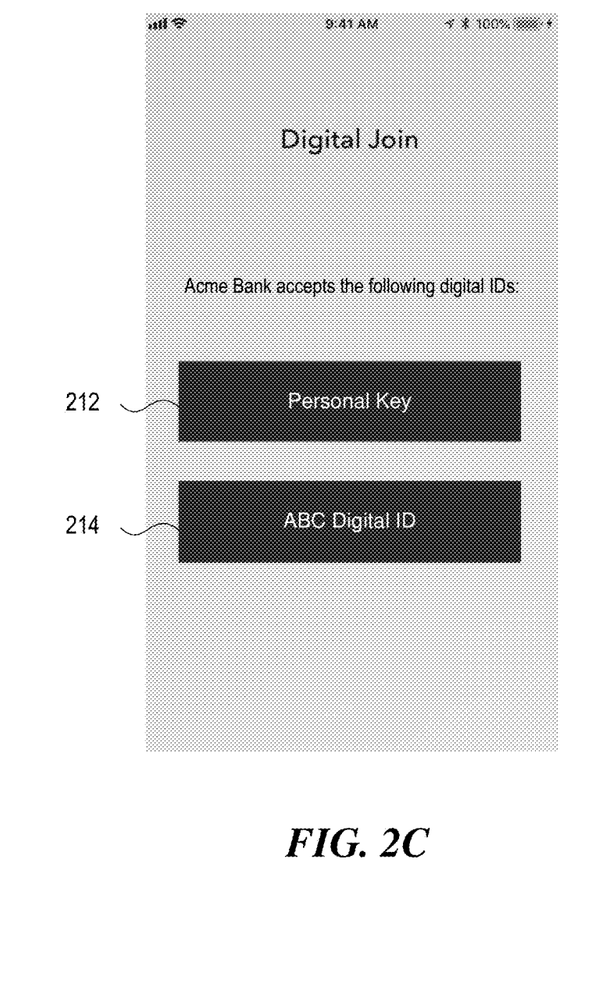

Once the user logs in, the mobile device application may display to the user at least two options as shown in FIG. 2B: a first option to join manually 208 and a second option to join digitally 210. If the user selects the join manually option 208, the mobile device application can display to the user a set of fields for the user to manually enter his or her personal information. If the user selects the join digitally option 210, the mobile device application displays a GUI as shown in FIG. 2C where the user is presented with one or more digital identities, such as "Personal Key" 212 and "ABC Digital ID" 214. The names "Personal Key" and "ABC Digital ID" are example names of digital identity services that may be provided by a third-party vendor. In an example implementation, the mobile device application displays the one or more digital identities, as shown in FIG. 2C, based on a scan performed by the mobile device application. For example, the mobile device application may scan one or more locations on the mobile device to determine that a digital identifier (e.g., identifier 12345 described above) is stored on the mobile device. In some embodiments, the mobile device and/or the financial institution server may receive a request to verify the identity of the user and to provide certain information using the digital identity service (e.g., by performing operations described for FIGS. 2B and/or 2C) after the financial institution server receives from the mobile device a request for the payment card or loan.

Figure 2D:
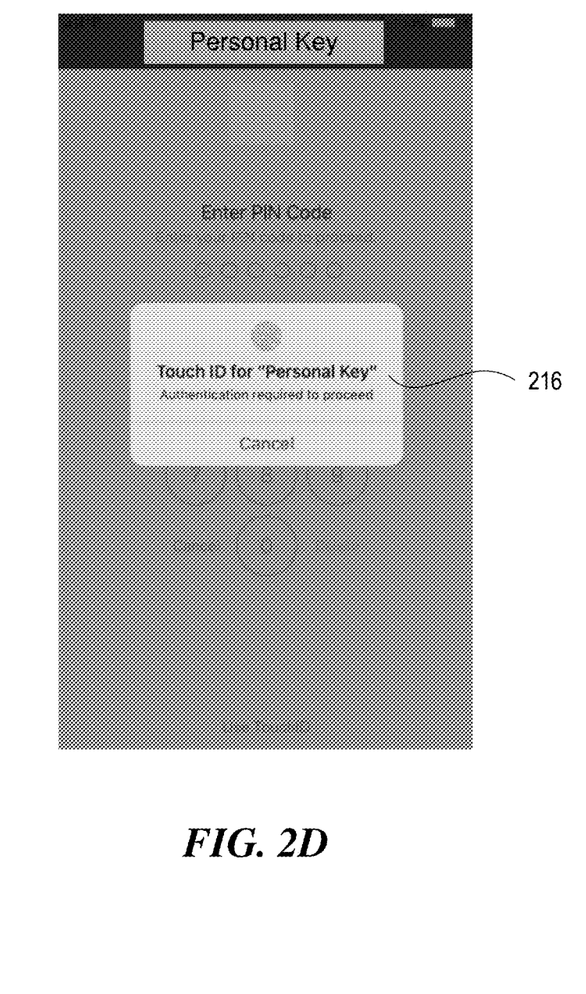

The financial institution server 130 receives from the mobile device 120 a first request to verify an identity of a user using a digital identity service (e.g., Personal Key). The user may select a digital identity service (e.g., Personal Key) from a plurality of options to verify the identity of the user. In response to receiving the first request to use the digital identity service (e.g., Personal Key), the financial institution server 130 sends to the digital identity server 150 a second request to obtain one or more categories of personal information about the user. As shown in FIG. 2D, the user authenticates with the digital identity service (e.g., Personal Key) associated with the digital identity server 150. In an example implementation, as shown in FIG. 2D, authentication may be performed at least in part by the user entering his or her password or biometric information 216 associated with the digital identity. In some embodiments, by providing authentication credentials, the user can use his or her private key to access the personal information associated with the digital identity. Thus, by performing authentication, the user can control his or her data and how it is shared.

After authentication, the digital identity server 150 sends to the mobile device 120 to display one or more names of the one or more categories 218a-218d of personal information. The categories shown in FIG. 2E include at least the one or more categories requested by the financial institution server 130 from the digital identity server 150. For example, the financial institution server 130 may require personal information associated with the categories 218a-218d shown in FIG. 2E to approve the user for a payment card or a loan. The financial institution server 130 can send a message to the digital identity server indicating the information being requested. As shown in FIG. 2F, each category is selectable by the user using the application running on the mobile device 120, using for example a toggle switch 219 associated with each category. In some embodiments, only the categories of information requested by another party are shown. In other implementations, categories of information beyond what is requested are displayed for selection for the user. A benefit of presenting selectable categories to the user is to prevent against oversharing of personal information. For example, if the user does not want to share personal information associated with his or her military status, then the user may use the toggle switch associated with the "military service information" category (218d in FIG. 2E) to prevent the digital identity server 150 from sending the personal information associated with the "military service information" category to the financial institution server 130. In another example, if another category known as "shopping preferences" is included the list of categories and which may not be required by the financial institution server for performing its approval process, the user may use the toggle switch associated with the "shopping preferences" category to prevent the digital identity server 150 from sending the personal information associated with the "shopping preferences" category to the financial institution server 130.

Figure 2E:
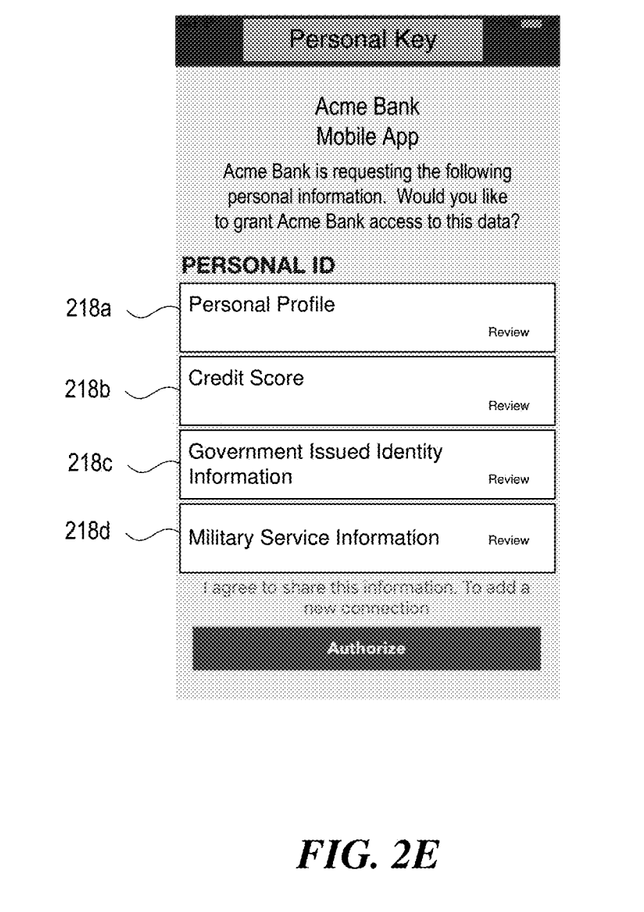
Figure 2F:
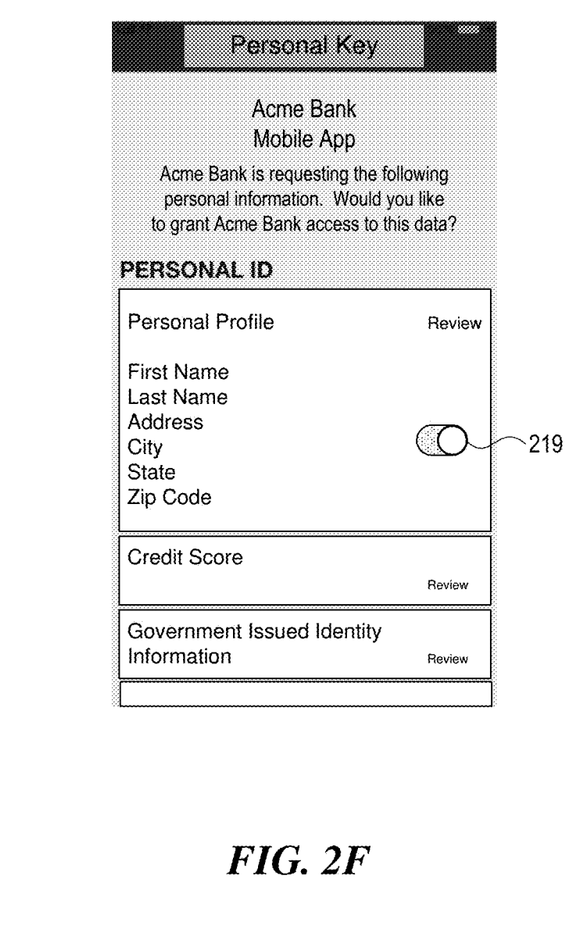
Figure 2G:
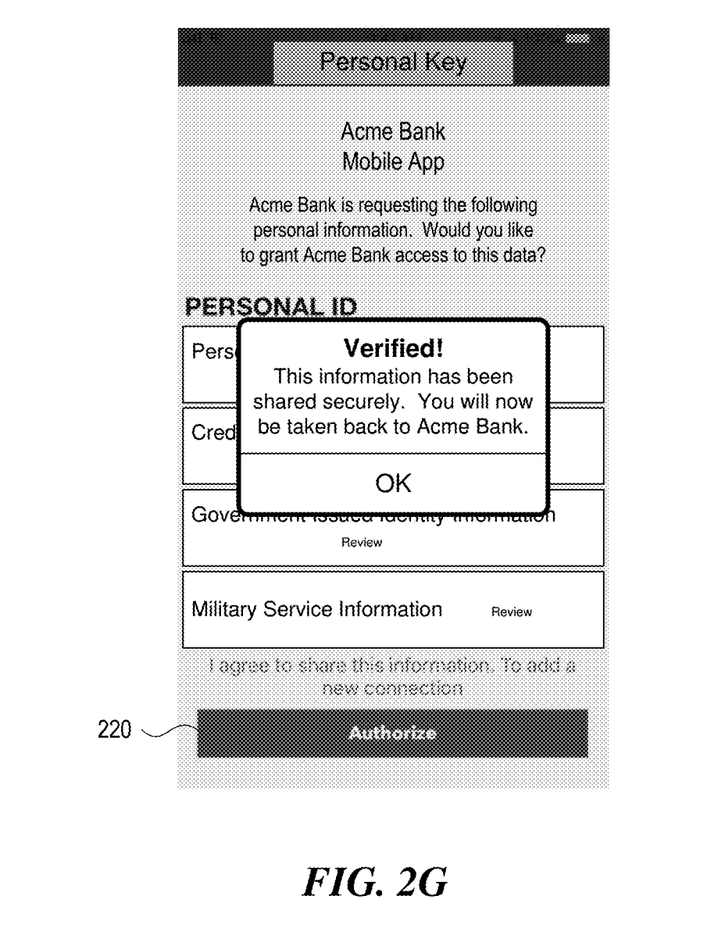

As shown in FIG. 2G, the digital identity server can tell the user that the user's information has been sent securely to the requestor (assuming the user selected the "authorize" button 220). By selecting the "authorize" button 220 in the mobile device application, the mobile device application receives an indication from the user that the digital identity server 150 is authorized to send the personal information from the selectable one or more categories to the financial institution server 130. After selecting the "authorize" button 220, the financial institution server 130 receives from the digital identity server 150, personal information associated with the one or more categories selected by or authorized by the user. In response to authorizing the sharing of personal information, the mobile device application may display a message informing the user that his or her personal information will be shared securely by the digital identity server 150 with the financial institution server 130. In some embodiments, the digital identity server 150 may encrypt the personal information sent to the financial institution server 130.

In some embodiments, if the user does not want to share personal information associated with his or her digital identity, the user may have an option not to share the personal information (not shown in FIGS. 2E-2F). If the user selects the option not to share the personal information, then the financial institution server may not issue a member ID (as shown in FIG. 2I) because the user chose not to share information that is necessary for the financial institution server to perform its verifications and/or authorizations. In such embodiments, the approval process may end and the mobile device application may display a message that states that the financial institution needs certain information necessary to open an account.

Figure 2H:
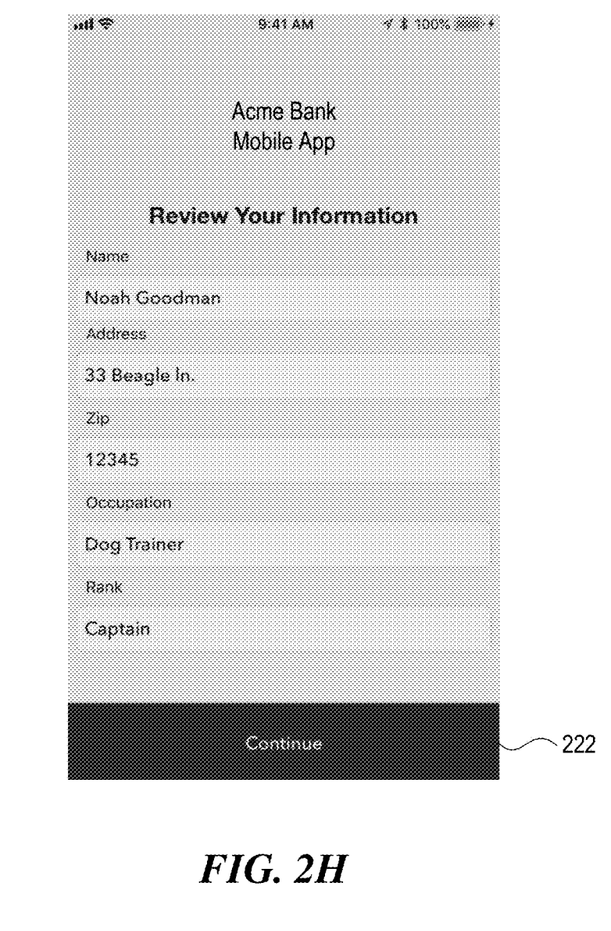
Figure 2I:
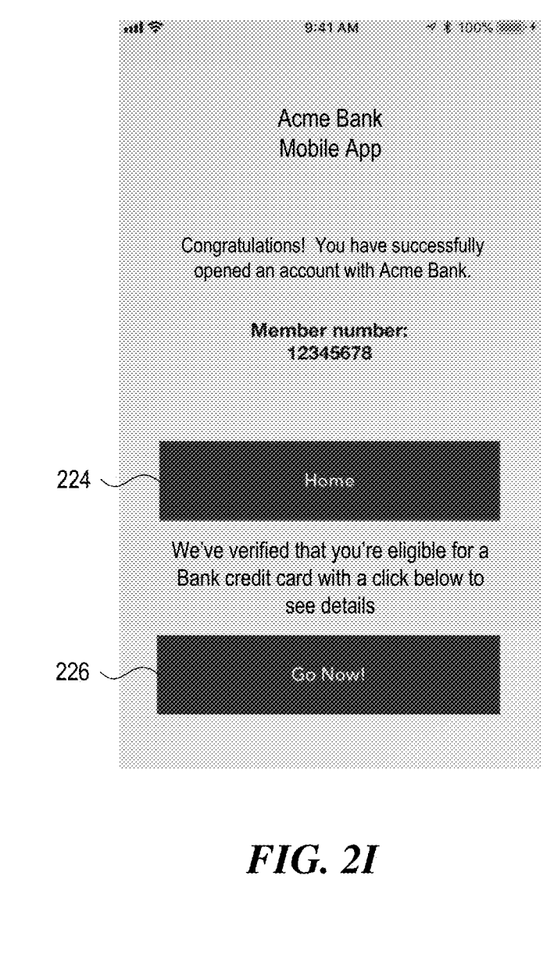

FIG. 2H shows a mobile device application displaying at least some of the personal information received by the financial institution server 130 from the digital identity server 150. In FIG. 2H, the mobile device application requests the user to review and confirm at least some of the personal information received by the financial institution server 130. For instance, based on the personal information received by the financial institution server for the "personal profile" category and "military service information" category (as shown in FIG. 2E), the financial institution server may send certain personal information (e.g., name, address, zip, occupation and military rank in FIG. 2H) to the mobile device so that the user may verify the displayed personal information. By clicking the "continue" button 222, the user can indicate to the mobile device application and/or to the financial institution server 130 that the personal information received by the financial institution server 130 is accurate.

In response to the user selecting the "continue" button 222 in FIG. 2H, the mobile device application may show a GUI shown in FIG. 2I where the mobile device application displays the new user's member number and/or options to go to the home screen 224 of the mobile device application or to continue with the process to obtain a payment card 226 or a loan. The member number may be generated by the financial institution server in response to receiving the personal information associated with the one or more categories requested by the financial institution server 130 from the digital identity server 150. In some embodiments, the financial institution server 130 may send to the mobile device 130 a message that states that the user is eligible for a payment card in response to determining, based on at least some of the received personal information, that the user is approved for a payment card. In some embodiments where the user uses his or her mobile device to update at least some of the personal information (as shown in FIG. 2H) sent by the digital identity server to the financial institution server, the financial institution server is configured to determine that the user is approved for the payment card based on at least some of the received personal information and at least some of the updated personal information.

Figure 2J:
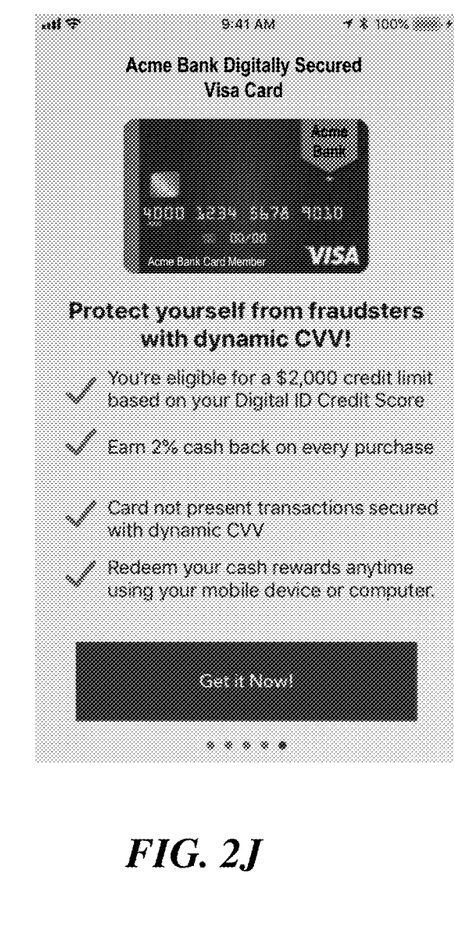
Figure 2K:
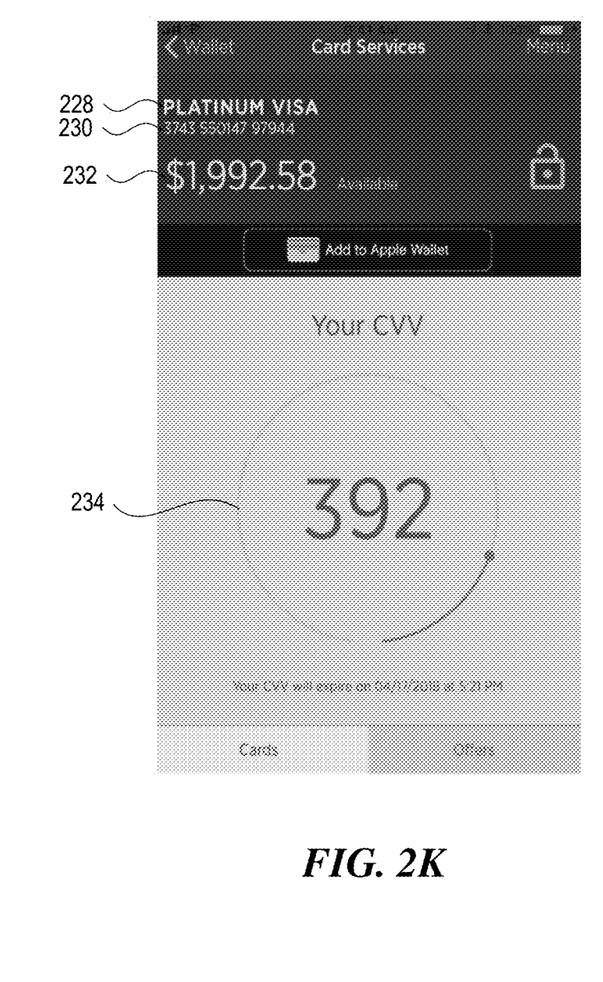

In FIG. 2I, upon selection of the "go now" option 226 by the user, the mobile device application can display one or more payment cards (as shown in FIG. 2J) or one or more types of loans for which the user may be eligible. If the user indicates to the mobile device application that the user wants a particular payment card or loan, the financial institution server 130 is provided with this indication, and in response, the financial institution server 130 may send to the mobile device 120, information associated with the selected payment card (as shown in FIG. 2K). Assuming that the user has access to the card verification value (or equivalent number) digitally, the user can instantly use the payment card on his or her mobile device. For example, if the user has a rotating credit verification value obtained from an application, the user can simply use rotating value and use the payment card immediately for at least Card Not Present transactions. Thus, a benefit of the approval system 100 is that a user does not have to wait for his or her payment card or loan approval papers to come in the mail. The approval system 100 facilitates an instant use of the payment card by efficiently processing and/or verifying a user's personal information.

FIG. 2K shows a GUI where the financial institution server has sent a payment card information to the mobile device. For example, FIG. 2K shows that the mobile device has received payment card information such as a name of the card 228, payment card number 230, and available payment card value 232. The payment card information may also include a periodically changing card verification value 234. The card verification value 232 may be changed by the financial institution server and may be sent to the mobile device. In embodiments, the card verification value 232 may be periodically changed by the financial institution server and may be periodically sent to the mobile device. In some embodiments, the card verification value 232 may be a static value. A benefit of a periodically changing card verification value is that it can provide extra security from fraudsters who may obtain a physical payment card but may not obtain the dynamically changing card verification value.

Figure 3:
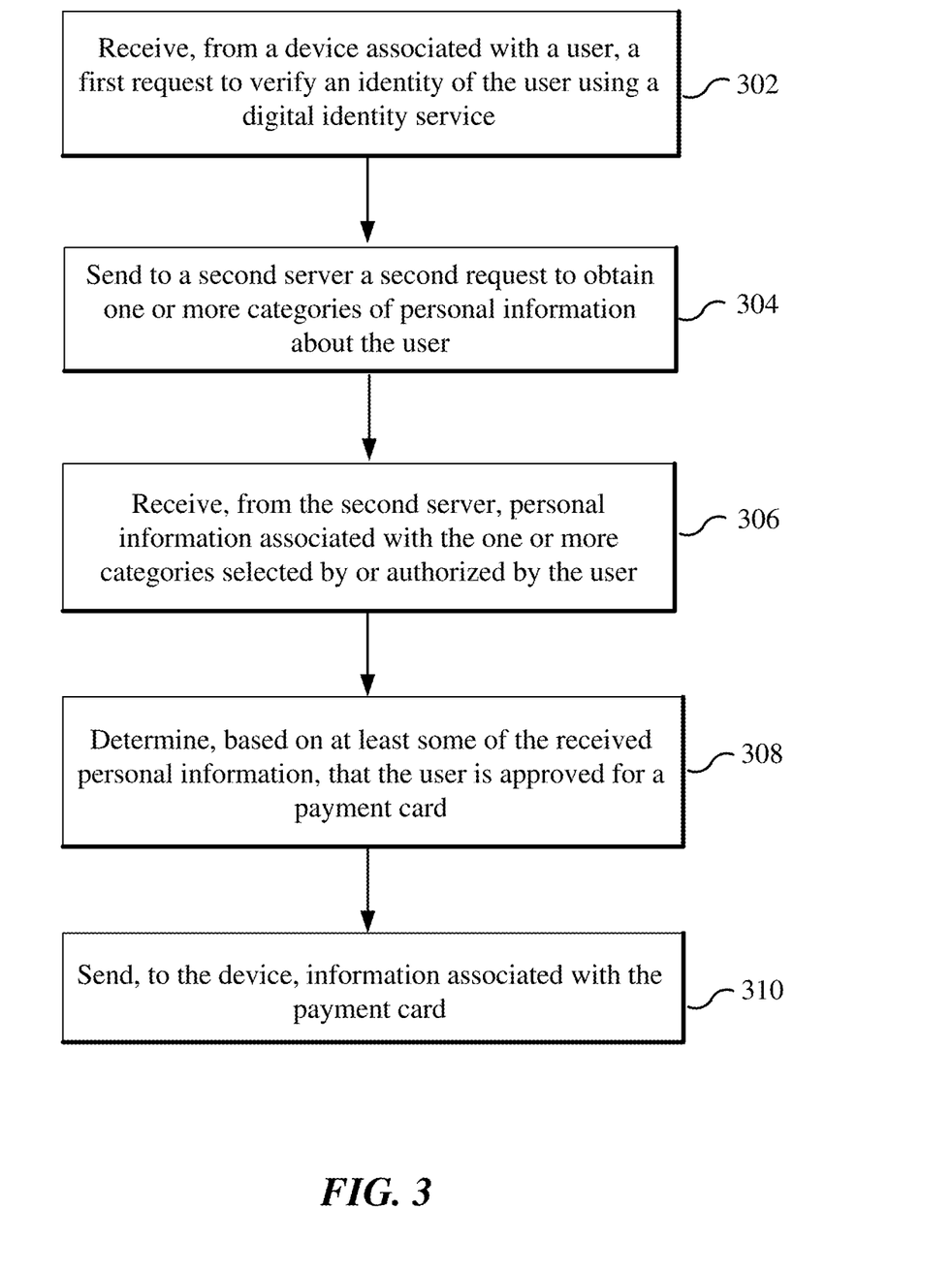
FIG. 3 shows a flowchart of an approval process for a payment card.

FIG. 3 shows a flowchart of an approval process for a payment card. At the receiving operation 302, a first server receives, from a device associated with a user, a first request to verify an identity of the user and/or obtain information about the user using a digital identity service. The digital identity service may be selected from a plurality of options to verify the identity of/provide personal information about the user. In some embodiments, the receiving operation 302 may be performed after the first server receives from the device a request for a payment card or other service offered by an organization associated with the first server.

After the receiving operation 302, at the sending operation 304, the first server sends to a second server a second request to obtain one or more categories of personal information about the user. The second server sends to the device to display one or more names of the one or more categories of personal information after the user authenticates with the digital identity service associated with the second server. In some embodiments, the user authenticates with the digital identity service using a password or biometric information. Each personal information category may be selectable by the user using the device. In some embodiments, the user's identity is verified in response to the first server receiving the personal information from the second server or receiving an indication that the user is authorized to send the personal information from the second server to the first server.

At the receiving operation 306, the first server receives, from the second server, personal information associated with the one or more categories selected by or authorized by the user. In some embodiments, the device is configured to update at least some of the personal information received by the first server, and the first server is configured to determine that the user is approved for the payment card based on at least some of the received personal information and at least some of the updated personal information. In some embodiments, the one or more categories of personal information received by the first server is encrypted.

At the determining operation 308, the first server determines, based on at least some of the received personal information, that the user is approved for a payment card. At the sending operation 310, the first server sends, to the device, information associated with the payment card. The device is configured to allow the user to use the payment card. In some embodiments, the information associated with the payment card includes a periodically changing card verification value.

The techniques described in this patent document for approval of a payment card may also be applicable for approving a line of credit, loans, mortgages, etc. By using a digital identity, the process to create an account and to acquire a financial product (e.g., a payment card) can be improved. Thus, the approval system described in this patent document may provide a user with a quick on-boarding experience, while maintaining the integrity of certain operations to determine whether the user is eligible for certain financial products based on the personal information of the user.

Figure 4:
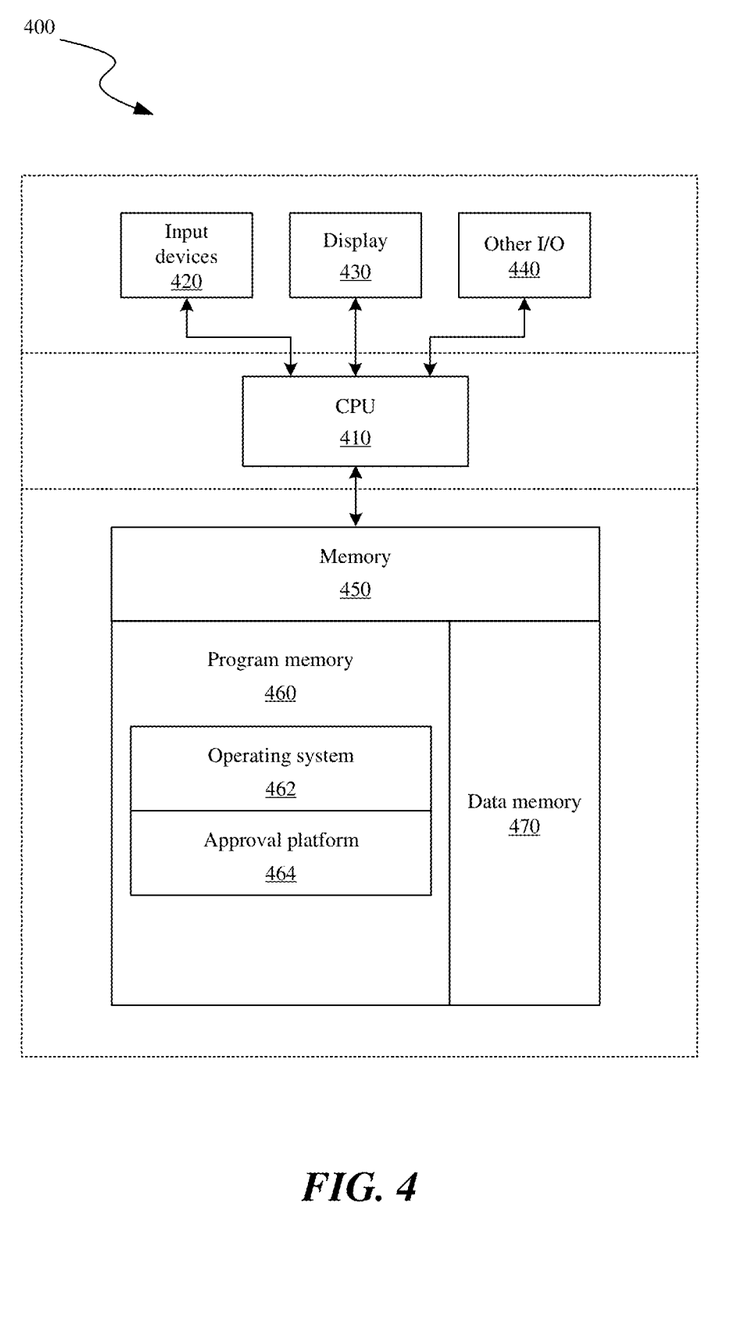
FIG. 4 is a block diagram illustrating an overview of devices on which some implementations of the disclosed technology can operate.

FIG. 4 is a block diagram illustrating an overview of devices on which some implementations of the disclosed technology can operate. The devices can comprise hardware components of a device 400, such as the financial institution server that manages the approval platform 464 for a user (e.g., a new member) to approve a payment card or a financial product. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a mobile device. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and approval platform 464. Thus, for example, the memory 450 may store instructions that upon execution by CPU 410 configure the device 400 to perform the operations described for the financial institution servers in FIGS. 1 to 3 and/or in the various embodiments described in this patent document. Memory 450 can also include data memory 470 that can include the personal information obtained from the digital identity server, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
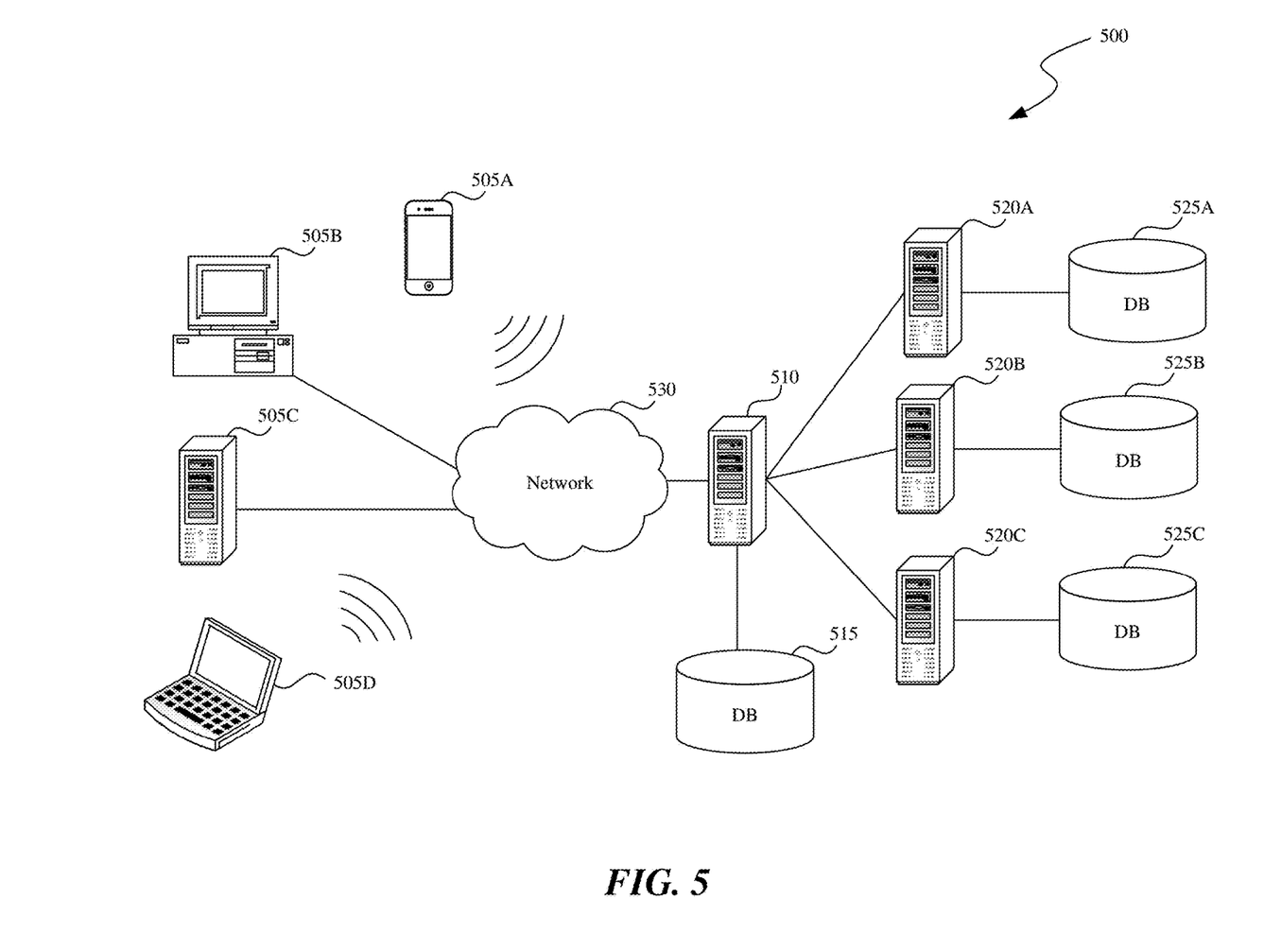
FIG. 5 is a block diagram illustrating an overview of an environment in which some implementations of the disclosed technology can operate.

FIG. 5 is a block diagram illustrating an overview of an environment 500 in which some implementations of the disclosed technology can operate. Environment 500 can include one or more client computing devices 505A-D. The mobile device described in this patent document can be considered a client computing device shown in FIG. 5. Client computing devices 505A-D can operate in a networked environment using logical connections through network 530 to one or more remote computers, such as a server computing device 510. As shown in FIG. 5, examples of client computing devices 505A-D may include a portable electronic device 505A, a computer 505B, a server 505C, or a laptop 505D.

In some implementations, server computing device 510 can be an edge server that receives client requests and coordinates fulfillment of those requests through other servers, such as servers 520A-C. The financial institution server mentioned in this patent document may include the server computing device 510 and/or one or more server computing devices 520A-C. Though each server computing device 510 and 520A-C is displayed logically as a single server, server computing devices can each be a distributed computing environment encompassing multiple computing devices located at the same or at geographically disparate physical locations. In some implementations, each server computing device 520 corresponds to a group of servers. While not shown in FIG. 5, one or more servers and/or corresponding database may be associated with the digital identity server as described in this patent document. The one or more servers associated with the digital identity server can communicate with one or more server computing devices 510, 520A-C, and the client computing devices 505A-D via the network 530.

Client computing devices 505A-D and server computing devices 510 and 520A-C can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as personal information (e.g., name, date of birth, credit information, military status, etc.,), member identification number, and/or approved payment card information. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505A-D can be connected to network 530 through a network interface, such as by wired or wireless communication. While the connections between server 510 and servers 520A-C are shown as separate connections, these connections can be any kind of local, wide area, wired, or wireless network, including network 530 or a separate public or private network.

Figure 6:
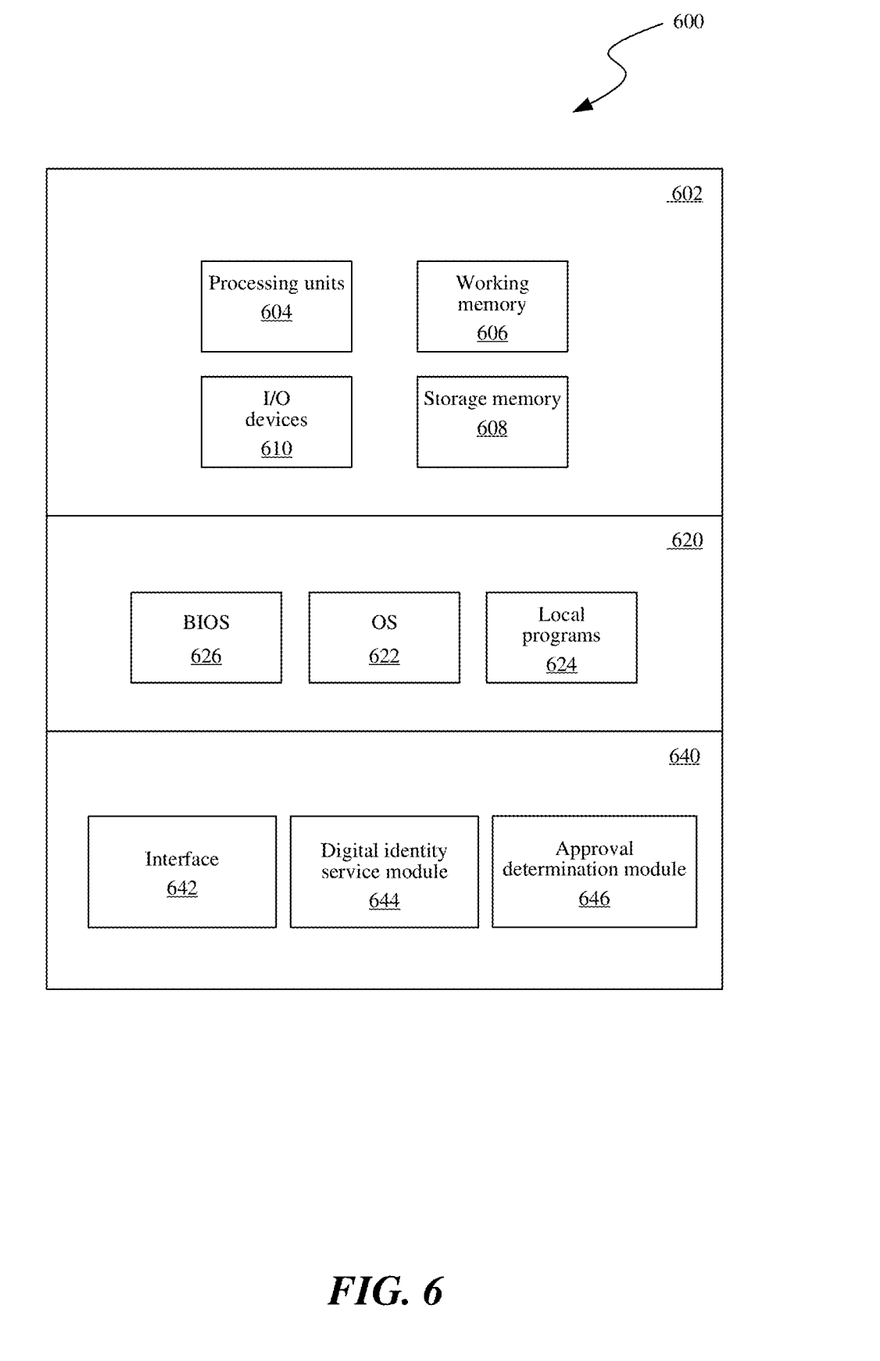
FIG. 6 is a block diagram illustrating components which can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Some or all of the components 600 can be implemented on a server computing device, such as server computing device 510 or 520A-C. For example, a memory may store instructions that upon execution by the processing units 604 configure the financial institution server to perform the operations described in FIGS. 1-3 and/or in the various embodiments described in this patent document.

General software 620 can include various applications, including an operating system 622, local programs 624, and a basic input output system (BIOS) 626. Specialized components 640 can be subcomponents of a general software application 620, such as local programs 624. Specialized components 640 can include any one or more of a digital identity service module 644 that receives a first request to verify an identity of the user using a digital identity service and that requests and receives one or more categories of personal information about the user from a digital identity server; approval determination module 646 that determines that the user is approved for a payment card or a loan based on at least some of the received personal information; and an information module that can send to a mobile device information associated with the payment card, and components that can be used for transferring data and controlling the specialized components, such as interface 642. In some implementations, components 600 can be in a computing system that is distributed across multiple computing devices or can be an interface to a server-based application executing one or more of specialized components 640.

Those skilled in the art will appreciate that the components illustrated in FIGS. 4-6 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system, comprising:
   a first server configured to:
   receive, from a user device associated with a user, a request for a payment card to be issued to the user;
   receive, from the user device, a first request to verify an identity of the user using a digital identity service, wherein the digital identity service is selected by the user from a plurality of options for verifying the identity of the user and to provide personal information of the user to the first server;
   in response to receiving the selection of the digital identity service, send, to a second server associated with the digital identity service, a second request to obtain one or more categories of the personal information about the user,
      wherein after the user authenticates with the digital identity service associated with the second server, the second server sends to the user device to display one or more names of the one or more categories of personal information, and
      wherein each category is selectable by the user using the user device,
      wherein the user selects, via the user device, at least one of the one or more categories of personal information;
   in response to the user selecting the at least one of the one or more categories of personal information, receive, from the second server, encrypted personal information associated with the at least one of the one or more categories;
   in response receiving the encrypted personal information from the second server, decrypt the encrypted personal information to verify the identity of the user to approve the user for the payment card based on the personal information;
   in response to verifying the identity of the user, generate, based on at least some of the received personal information, the payment card and a dynamic card verification value associated with the payment card, wherein the dynamic card verification value is displayed in a mobile application on the user device; and in response to generating the payment card, send, to the user device, information associated with the payment card to allow the user to begin using the generated payment card with no delay after approving the user for the payment card, wherein the mobile application sends the dynamic card verification value of the payment card to a mobile wallet of the user over a local connection within the user device.

2. The system of claim 1, wherein the user device is configured to update at least some of the personal information received by the first server, and wherein the first server is configured to determine that the user is approved for the payment card based on at least some of the received personal information and at least some of the updated personal information.

3. The system of claim 1, wherein the first server is configured to receive the first request to verify the identity of the user using the digital identity service after the first server receives from the user device the request for the payment card.

4. The system of claim 1, wherein the information associated with the payment card includes the dynamic card verification value.

5. The system of claim 1, wherein the user authenticates with the digital identity service using a password or biometric information.

6. The system of claim 1, wherein the one or more categories of personal information received by the first server is encrypted.

7. The system of claim 1, wherein the one or more categories of personal information include a personal profile and a credit score.

8. A method for approving a payment card, the method comprising:

receiving, by a first server from a user device associated with a user, a request for a payment card to be issued to the user;

receiving, by the first server from the user device, a first request to verify an identity of a user using a digital identity service, wherein the user device is used by the user to select the digital identity service from a plurality of options for verifying the identity of the user and to provide personal information of the user to the first server;

in response to receiving the selection of the digital identity service, sending, to a second server associated with the digital identity service, a second request to obtain one or more categories of the personal information about the user, wherein after the user authenticates with the digital identity service associated with the second server, the second server sends to the user device to display one or more names of the one or more categories of the personal information, and wherein each category is selectable by the user using the user device, wherein the user selects, via the user device, at least one of the one or more categories of personal information;

in response to the user selecting the at least one of the one or more categories of personal information, receiving, from the second server, encrypted personal information associated with the at least one of the one or more categories;

in response receiving the encrypted personal information from the second server, decrypting the encrypted personal information to verifying the identity of the user to approve the user for the payment card based on the personal information;

in response to verifying the identity of the user, generating, based on at least some of the received personal information, a payment card and a dynamic card verification value associated with the payment card, wherein the dynamic card verification value is displayed in a mobile application on the user device; and in response to generating the payment card, sending, to the user device, information associated with the payment card to allow the user to begin using the generated payment card with no delay after approving the user for the payment card, wherein the mobile application sends the dynamic card verification value of the payment card to a mobile wallet of the user over a local connection within the user device.

9. The method of claim 8, wherein determining that the user is approved for the payment card is based on at least some of the received personal information and at least some of updated personal information, and wherein the updated personal information includes an update to at least some of the received personal information.

10. The method of claim 8, wherein the first request to verify the identity of the user using the digital identity service is received after the first server receives from the user device the request for the payment card.

11. The method of claim 8, wherein the information associated with the payment card includes the dynamic card verification value.

12. The method of claim 8, wherein the one or more categories of personal information received by the first server is encrypted.

13. The method of claim 8, wherein the one or more categories of personal information include a personal profile and a credit score.

14. A non-transitory computer-readable medium comprising computer-readable instructions to approve a payment card, said computer-readable instructions comprising instructions that perform a method comprising:

receiving, by a first server from a user device associated with a user, a request for a payment card to be issued to the user;

receiving, by the first server from the user device, a first request to verify an identity of a user using a digital identity service, wherein the user device is used by the user to select the digital identity service from a plurality of options for verifying the identity of the user and to provide personal information of the user to the first server;

in response to receiving the selection of the digital identity service, sending, to a second server associated with the digital identity service, a second request to obtain one or more categories of the personal information about the user, wherein after the user authenticates with the digital identity service associated with the second server, the second server sends to the user device to display one or more names of the one or more categories of the personal information, and wherein each category is selectable by the user using the user device, wherein the user selects, via the user device, at least one of the one or more categories of personal information;

in response to the user selecting the at least one of the one or more categories of personal information, receiving, from the second server, encrypted personal information associated with the at least one of the one or more categories;

in response receiving the encrypted personal information from the second server, decrypting the encrypted personal information to verifying the identity of the user to approve the user for the payment card based on the personal information;

in response to verifying the identity of the user, generating, based on at least some of the received personal information, a payment card and a dynamic card verification value associated with the payment card, wherein the dynamic card verification value is displayed in a mobile application on the user device; and in response to generating the payment card, sending, to the user device, information associated with the payment card to allow the user to begin using the generated payment card with no delay after approving the user for the payment card, wherein the mobile application sends the dynamic card verification value of the payment card to a mobile wallet of the user over a local connection within the user device.

15. The non-transitory computer-readable medium of claim 14, wherein determining that the user is approved for the payment card is based on at least some of the received personal information and at least some of updated personal information, and wherein the updated personal information includes an update to at least some of the received personal information.

16. The non-transitory computer-readable medium of claim 14, wherein the first request to verify the identity of the user using the digital identity service is received after the first server receives from the user device the request for the payment card.

17. The non-transitory computer-readable medium of claim 14, wherein the information associated with the payment card includes the dynamic card verification value.

18. The non-transitory computer-readable medium of claim 14, wherein the one or more categories of the personal information received by the first server is encrypted.

19. The non-transitory computer-readable medium of claim 14, wherein the one or more categories of personal information include a personal profile and a credit score.

* * * * *